(12) United States Patent
Johansen

(10) Patent No.: US 12,372,800 B2
(45) Date of Patent: Jul. 29, 2025

(54) DIFFRACTIVE OPTICAL ELEMENTS

(71) Applicant: NIL Technology ApS, Kongens Lyngby (DK)

(72) Inventor: Villads Egede Johansen, Copenhagen (DK)

(73) Assignee: NIL Technology ApS, Kongens Lyngby (DK)

( * ) Notice: Subject to any disclaimer, the term of this patent is extended or adjusted under 35 U.S.C. 154(b) by 425 days.

(21) Appl. No.: 17/908,840

(22) PCT Filed: Mar. 3, 2021

(86) PCT No.: PCT/EP2021/055389
§ 371 (c)(1),
(2) Date: Sep. 1, 2022

(87) PCT Pub. No.: WO2021/180549
PCT Pub. Date: Sep. 16, 2021

(65) Prior Publication Data
US 2023/0213779 A1    Jul. 6, 2023

Related U.S. Application Data

(60) Provisional application No. 62/988,124, filed on Mar. 11, 2020.

(51) Int. Cl.
*G02B 27/42* (2006.01)
*G02B 5/02* (2006.01)

(52) U.S. Cl.
CPC ......... *G02B 27/425* (2013.01); *G02B 5/0252* (2013.01)

(58) Field of Classification Search
CPC ............ G02B 27/425; G02B 5/0252; G02B 2207/101; G02B 5/0268; G02B 5/0278;
(Continued)

(56) References Cited

U.S. PATENT DOCUMENTS 6,285,503 B1    9/2001   Chao et al.
6,859,326 B2    2/2005   Sales
(Continued)

FOREIGN PATENT DOCUMENTS

CN    1478205 A    2/2004
JP    S51-124441 A    10/1976
(Continued)

OTHER PUBLICATIONS

Johansen, "Optical role of randomness for structured surfaces," Apr. 2014, vol. 53, No. 11, Applied Optics (Year: 2014).*
(Continued)

*Primary Examiner* — Thomas K Pham
*Assistant Examiner* — Jennifer A Jones
(74) *Attorney, Agent, or Firm* — Fish & Richardson P.C.

(57) ABSTRACT

Techniques for designing diffractive optical elements (DOEs) such as diffusers and other optical beam shaping elements can include designing a DOE unit cell on a smaller area than the overall area of the DOE, and then distributing the unit cell across the entire surface for the DOE. Height translations are introduced for at least some of the unit cells distributed across the surface, where the height translations correspond to respective phase translations for the intended operational wavelength of the DOE. In some instances, phase wrapping is introduced to translate the height variations among the unit cells into unit cells having sub-unit structures whose heights fall within a range that corresponds to a specified phase range at the operational wavelength.

12 Claims, 4 Drawing Sheets

(58) Field of Classification Search
CPC .. G02B 5/1809; G02B 5/1857; G02B 5/1871; G02B 5/021; B82Y 20/00
See application file for complete search history.

(56) References Cited

U.S. PATENT DOCUMENTS

| | | | |
|---|---|---|---|
| 10,473,834 B2* | 11/2019 | Channon | G02B 1/14 |
| 2002/0034710 A1 | 3/2002 | Morris et al. | |
| 2006/0028957 A1 | 2/2006 | Kim | |
| 2009/0034036 A1 | 2/2009 | Matsubara | |
| 2010/0020400 A1* | 1/2010 | Amako | B23K 26/0673 |
| | | | 430/321 |
| 2011/0298896 A1 | 12/2011 | Dillon et al. | |
| 2013/0208332 A1 | 8/2013 | Yu et al. | |
| 2019/0064532 A1 | 2/2019 | Riley, Jr. et al. | |
| 2019/0250313 A1 | 8/2019 | Shibuya et al. | |
| 2020/0041615 A1 | 2/2020 | Frederiksen et al. | |
| 2020/0116908 A1* | 4/2020 | Toyama | G02B 5/1871 |

FOREIGN PATENT DOCUMENTS

| | | |
|---|---|---|
| JP | H11-183716 A | 7/1999 |
| JP | 2002-040219 A | 2/2002 |
| JP | 2003-517619 A | 5/2003 |
| JP | 2009-134287 A | 6/2009 |
| JP | 2013-205512 A | 10/2013 |
| JP | 2013-205513 A | 10/2013 |
| JP | 2019-070784 A | 5/2019 |
| JP | 2019-139163 A | 8/2019 |
| WO | WO 2015/115046 A1 | 8/2015 |
| WO | WO 2018/174057 A1 | 9/2018 |

OTHER PUBLICATIONS

International Search Report and Written Opinion in International Appln. No. PCT/EP2021/055389, dated May 19, 2021, 11 pages.
Johansen, "On the Optical Role of Randomness for Structured Surfaces," Applied Optics, 2014, 53(11):2405-2415.
International Preliminary Report on Patentability in International Appln. No. PCT/EP2021/055389, dated Sep. 22, 2022, 8 pages.
Office Action in Japanese Appln. No. 2022-554847, mailed on Feb. 4, 2025, 6 pages (with English translation).

* cited by examiner

DIFFRACTIVE OPTICAL ELEMENTS

CROSS-REFERENCE TO RELATED APPLICATION(S)

This application is a National Stage Application under 35 U.S.C. § 371 and claims the benefit of International Application No. PCT/EP2021/055389, filed Mar. 3, 2021, which claims priority to U.S. Application No. 62/988,124, filed Mar. 11, 2020, the disclosure of which is incorporated herein by reference.

FIELD OF THE DISCLOSURE

The present disclosure relates to diffractive optical elements (DOEs).

BACKGROUND

DOEs are optical components that are operable to modify an incident light's phase and/or amplitude to create a desired optical output pattern with a specified functionality. DOEs may have a structure composed, for example, of multiple levels, formed on the surface of a substrate. The pattern may be etched, for example, into the surface of a hard substrate or replicated in a polymer on the surface of a substrate or made purely in polymer. In some instances, the depth of the pattern may be on the order of the wavelength of the light, specific to the application, and adjusted to the refractive index of the material of the DOE.

When designing diffractive optical elements, such as DOE diffusers, it may be disadvantageous in some respects to consider the entire active area of the diffuser in attempting to optimize the design. In particular, designing over a large area can be computationally complex. For example, in some instances, a 2×2 mm2 diffuser with a 500×500 nm2 pixel resolution results in sixteen million pixel elements to control. Further, although numerical complexity might be reduced by using the Iterative Fourier Transform Algorithm (IFTA), the IFTA can introduce various design limitations that may not be desirable. Such limitations may relate, for example, to the amount of control over the optimization algorithm, the evaluation plane being in the far field, resolution of the evaluation plane being given by resolution of the design plane, and the method being based on the thin element approximation.

SUMMARY OF THE DISCLOSURE

The present disclosure describes techniques for designing diffractive optical elements (DOEs) such as diffusers and other optical beam shaping elements. The techniques can include designing a DOE unit cell on a smaller area than the overall area of the DOE, and then distributing the unit cell (e.g., in a periodic manner) across the entire surface for the DOE. Height translations can be introduced for at least some of the unit cells distributed across the surface, where the height translations correspond to respective phase translations for the intended operational wavelength of the DOE.

In some instances, phase wrapping can be introduced to translate the height variations among the unit cells into unit cells having sub-unit structures whose heights fall within a range that corresponds to a specified phase range (e.g., 0 to $2\pi$) at the operational wavelength. That is, after introducing the height translations to the unit cells, the heights of individual sub-units that correspond to phase values outside a defined range (e.g., outside the range 0 to $2\pi$) are folded back into heights that correspond to phase values that are within the defined range (e.g., 0 to $2\pi$).

In one aspect, the present disclosure describes a diffractive optical element that includes a plurality of periodically repeating unit cells distributed over a common plane and composed of an optical material. Each unit cell within the plurality of unit cells including a respective plurality of subunit cells, wherein the subunit cells are arranged to cause an optical effect to incident light of a predetermined operational wavelength. Each of the subunit cells in each particular one of the unit cells has a subunit height that differs from the respective heights of adjacent ones of the subunit cells in the same unit cell. The plurality of unit cells includes at least one base unit cell and other unit cells that are not a base unit cell, wherein each of the unit cells that is not a base unit cell is a height-translated version of the base unit cell relative to the common plane.

Some implementations include one or more of the following features. For example, in some instances, each of the height translated versions of the base unit cell corresponds to a respective phase shift at the operational wavelength. Further, in some cases, each of the respective phase shifts is a respective integer multiple of $(½)\pi$ at the operational wavelength. In some implementations, the subunit heights span four, eight or sixteen discrete levels relative to the common plane.

In some implementations, the respective heights of adjacent ones of the subunit cells that are in the same unit cell differ by an amount that corresponds to a respective phase shift that is equal to an integer multiple of $(½)\pi$ at the operational wavelength.

The present disclosure also describes a diffractive optical element that includes a plurality of unit cells distributed over a common plane and composed of an optical material. Each unit cell within the plurality of unit cells includes a respective plurality of subunit cells, wherein the subunit cells are arranged to cause an optical effect to incident light of a predetermined operational wavelength. Each of the subunit cells in each particular one of the unit cells has a respective subunit height that differs from the respective heights of adjacent ones of the subunit cells in the same unit cell. The plurality of unit cells includes at least one base unit cell and other unit cells that are not a base unit cell, wherein each of the unit cells that is not a base unit cell is a phase-wrapped version of a height-translated version of the base unit cell relative to the common plane.

Some implementations include one or more of the following features. For example, in some instances, a difference in height between any two of the subunits in the diffractive optical element corresponds to a respective phase shift of no more than $2\pi$ at the operational wavelength. Further, in some cases, each of the respective phase shifts is a respective whole number multiple of $(½)\pi$ at the operational wavelength. In some implementations, the subunit heights span four, eight or sixteen discrete levels relative to the common plane.

In some implementations, the respective heights of adjacent ones of the subunit cells that are in the same unit cell differ by an amount that corresponds to a respective phase shift that is equal to an integer multiple of $(½)\pi$ at the operational wavelength.

In some implementations, the optical effect is a substantially diffuse illumination.

Some implementations include one or more of the following advantages. For example, the techniques can be relatively efficient computationally, and thus, in some instances, can be advantageous in terms of feasibility, design time and numerical techniques (e.g., full-wave solvers, non FFT-based scalar propagation, free-form surface shaping). Further, introducing the height translations for the unit cells can help cancel diffraction that would otherwise occur as a result of distributing the unit cell across the surface in a periodic manner. Such diffraction may cause the diffuser effect to be lost. That is, by distributing the unit cell across the surface in a periodic manner, the unit cells can interfere and create a diffraction grating effect such that the diffusing properties are lost and replaced by high-intensity diffraction spots. Introducing the height translations for the unit cells can obviate this problem.

Further, the phase wrapping can help reduce the number of levels in the resulting DOE design. The reduction in the number of levels in the DOE design can, in turn, reduce the number of etch steps required during the manufacturing process.

The present disclosure also describes modules that include a diffractive optical element. The modules may include light emitting components, light sensing components, or both light emitting and light sensing components. The diffractive optical element(s) may be disposed so as to intersect an emitted or incoming light wave and to modify one or more characteristics of the emitted or incoming light wave as it passes through the diffractive optical element(s).

Other aspects, features and advantages will be apparent from the following detailed description, the accompanying drawings, and the claims.

DETAILED DESCRIPTION

Figure 1:
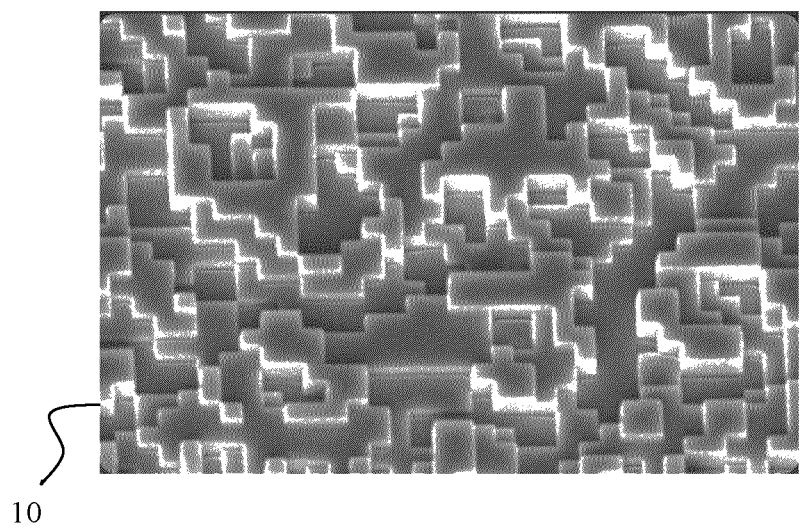
FIG. 1 shows an example of a DOE structure.

FIG. 1 illustrates an example of a DOE, such as a diffuser or other beam shaping element. In some implementations, as illustrated in FIG. 1, the DOE 10 includes a multi-level (e.g., stepped) structure having N levels, where N is at least 2 (e.g., 4, 8, or 16). Examples of suitable materials for the DOE 10 include silicon, polysilicon, fused silica, aluminum oxide ($Al_2O_3$), metals, dielectrics, and/or semiconductors. The material for the DOE 10 can be selected, for example, based on its having a particular refractive index at a specified operational wavelength (e.g., in the infra-red or visible range).

One of the initial tasks in fabricating DOEs is to determine a pixel or other layout design based on the desired optical performance and design criteria of the optical elements. In this context, a pixel refers to the smallest building block used when making the optical design. Typically, each pixel in the design can have, for example, a regular polygonal shape (e.g., rectangular or square) whose sides may have dimensions on the order of several hundred nanometers (nm) or less. The layout design can include the pixel layout corresponding to an individual DOE, as well as the overall layout for wafer-level production. The depth of the pixels in the DOE structure may differ from one another. Thus, the pixel layout design may include multiple levels, each of which corresponds to a different depth. In some instances there may be as many as four, eight or sixteen different levels, although the particular number of levels will depend on the optical performance and functionality needed for the particular application. The pixel layout design includes a respective pattern or other layout of pixels for each level, and can include, for example, microstructures and/or nanostructures. A master tool then is prepared based on the pixel layout design. Thus, the master tool can include a multi-level structured surface that corresponds to the pixel layout design. The structured surface can be transferred (e.g., by replication) to other materials.

Figure 2:
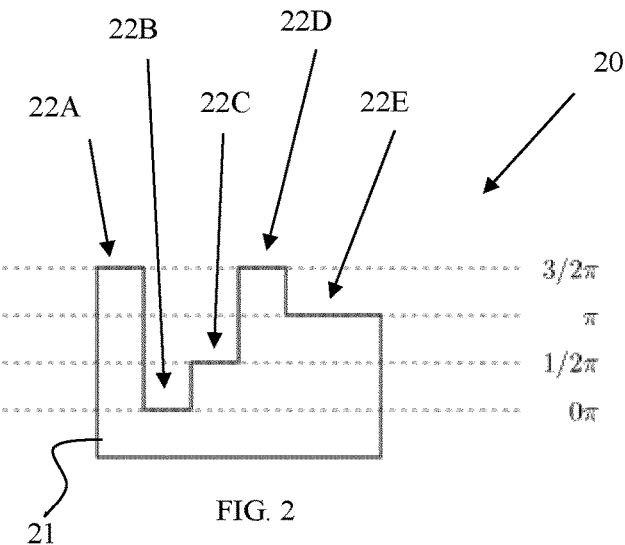
FIG. 2 is an example of a unit cell for the design of a DOE.

FIGS. 2-6 illustrate operations in a process for designing a DOE. As shown in FIG. 2, a 4-level unit cell 20 includes a base 21. In the illustrated example, the unit cell 20 has subunits 22A, 22B, 22C, 22D, 22E, each of which defines a respective contiguous area of the unit cell 20 and extends to a height defined by a respective one of the four levels. The height of each level of the unit cell 20 corresponds to a respective phase shift at the operational wavelength for which the DOE is designed. Thus, in the illustrated example, subunits 22A and 22D extend to a first height that corresponds to a first phase shift of $(3/2)\pi$. Likewise, the subunit 22E extends to a second height that corresponds to a second phase shift of $\pi$, the subunit 22C extends to a third height that corresponds to a third phase shift of $(½)\pi$, and the subunit 22B extends to a fourth height that corresponds to a fourth phase shift of 0. In some designs, the number and arrangement of the subunits may vary. Further, in some designs, the unit cell may have a different number of levels (e.g., 2, 8, 16).

Figure 3:
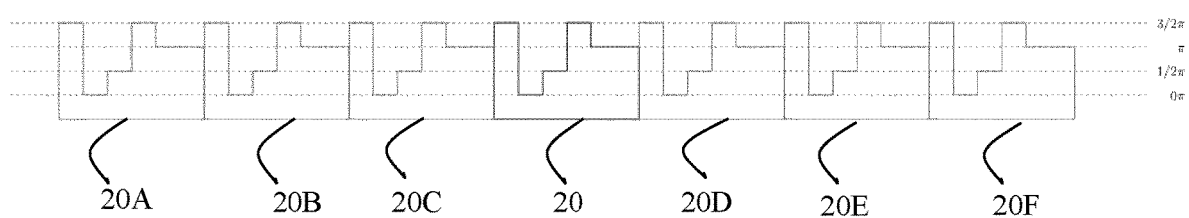
FIG. 3 shows an example of a periodic distribution of the unit cell of FIG. 2 across a common plane.

Next, as shown in FIG. 3, the design process can include distributing the unit cell 20 in a periodic manner across the surface specified for the DOE. Thus, at this stage, the design includes a one- or two-dimensional pattern of unit cells each of which is identical to the unit cell 20. Although FIG. 3 shows only seven unit cells (i.e., unit cells 20, and 20A through 20F), the design may have many more unit cells distributed across the area specified for the DOE. For example, in some instances, the design can include a distribution of about 50×50 unit cells.

The periodic distribution of the unit cell 20 across the surface tends to give rise to diffraction, which can result in deterioration or loss of the diffuser effect. To cancel such diffraction, a subsequent operation in the design of the DOE includes introducing height translations for at least some of the unit cells distributed across the surface, where the height translations of the unit cell correspond to respective phase translations at the intended operational wavelength for the DOE. That is, as shown in the example of FIG. 4, the heights of at least some of the unit cells are translated by respective amounts that correspond to phase shifts of $(½)\pi$, $(-½)\pi$, $\pi$ or $-\pi$ at the operational wavelength.

Figure 4:
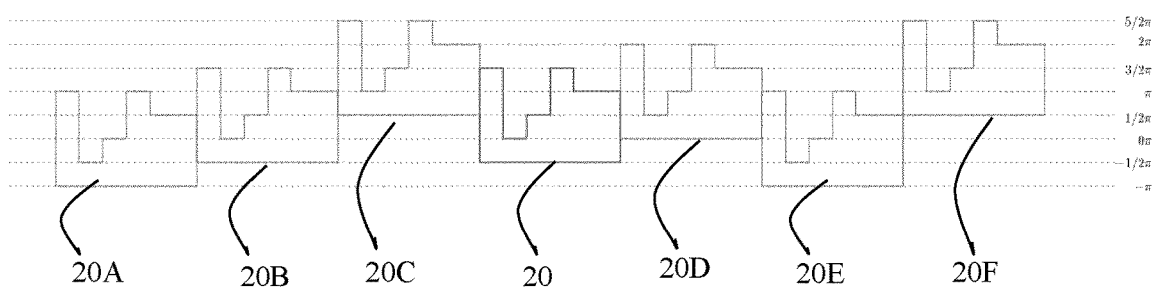
FIG. 4 shows height translated versions of the unit cells of FIG. 3

In FIG. 4, the unit cells 20C and 20F have been translated upward by an amount corresponding to a phase shift of $\pi$, whereas the unit cell 20D has been shifted upward by an amount corresponding to a phase shift of $(½)\pi$. On the other hand, the unit cells 20A and 20E have been translated downward by an amount corresponding to a phase shift of $(-½)\pi$. The unit cells 20 and 20B have not been translated upward or downward. In general, selection of which unit cells to translate, and whether to translate upward or downward for a given unit cell, may be done in a random manner. In some implementations, the height translations may correspond to phase shifts that differ from those mentioned above. Introducing the height translations for the unit cells can help cancel diffraction that would otherwise occur as a result of distributing the unit cell across the surface in a periodic manner.

Another result of the height translations for the unit cells as described above in connection with FIG. 4 is that the number of levels in the DOE design has increased to more than four. That is, in the example of FIG. 4, the subunits of the unit cells have at least seven different heights (i.e., corresponding to $-\pi$, $(-\frac{1}{2})\pi$, $0\pi$, $(\frac{1}{2})\pi$, $\pi$, $(3/2)\pi$, $2\pi$ and $(5/2)\pi$). In some implementations, having a greater number of levels can provide a more robust design. However, the increase in the number of levels also may make the manufacturing process for the DOEs more complex. Accordingly, in some implementations, it is desirable to perform further operations to reduce the number of levels in the final DOE design. As explained below, one technique for doing so employs phase wrapping.

Figure 5A:
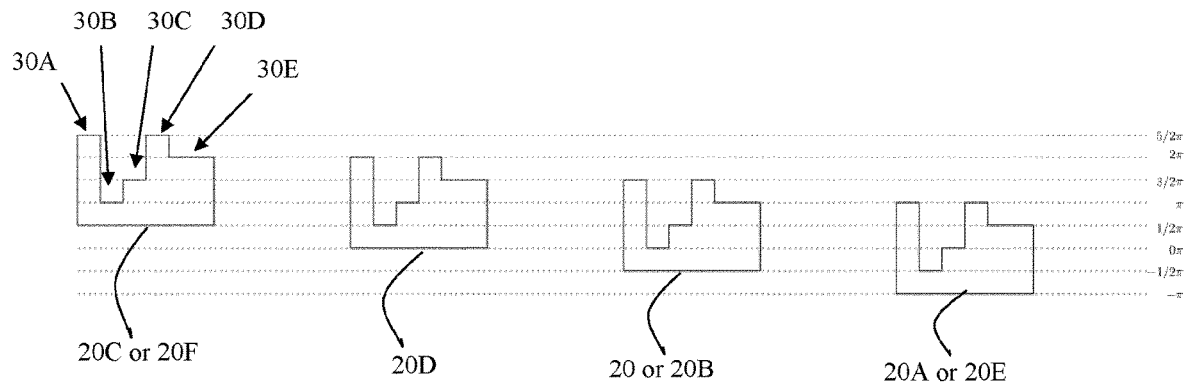
FIG. 5A shows examples of prototype unit cells based on the example of FIG. 4.
Figure 5B:
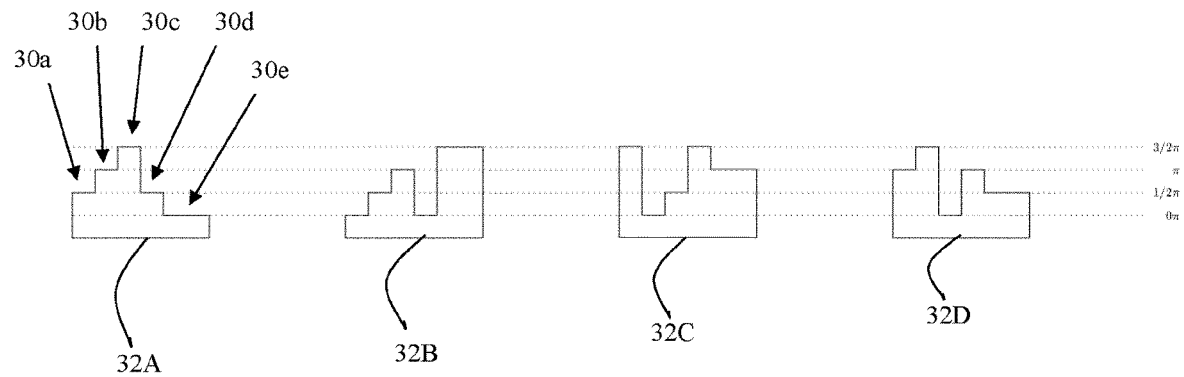
FIG. 5B shows phase wrapped versions of the prototype unit cells of FIG. 5A.

Phase wrapping can be introduced to translate the height variations among the unit cells into unit cells having sub-unit structures whose heights fall within a range that corresponds to a specified phase range (e.g., 0 to $2\pi$) at the operational wavelength. That is, after introducing the height translations to the unit cells, the heights of individual sub-units that correspond to phase values outside a defined range (e.g., outside the range 0 to $2\pi$) are folded back into heights that correspond to phase values that are within the defined range (e.g., 0 to $2\pi$). FIGS. 5A and 5B, discussed below, illustrate examples of phase wrapping.

FIG. 5A shows four prototype unit cells, which correspond to the various different translated unit cells in FIG. 4. That is, a first one of the prototype unit cells corresponds to the translated unit cells 20C and 20F of FIG. 4, a second one of the prototype unit cells corresponds to the translated unit cell 20D of FIG. 4, a third one of the prototype unit cells corresponds to the translated unit cells 20 and 20B of FIG. 4, and a fourth one of the prototype unit cells corresponds to the translated unit cells 20C and 20E of FIG. 4. During phase wrapping, each subunit (in any of the prototype unit cells) that has a height corresponding to a phase less than $0\pi$ is increased by a height that corresponds to a phase shift of $2\pi$. Likewise, each subunit (in any of the prototype unit cells) that has a height corresponding to a phase equal to or greater than $2\pi$ is decreased by a height that corresponds to a phase shift of $-2\pi$.

For example, the prototype unit cell at the far left-hand side of FIG. 5A corresponds to unit cells 20C and 20F of FIG. 4 and includes five subunits 30A, 30B, 30C, 30D, 30E having respective heights $(5/2)\pi$, $\pi$, $(3/2)\pi$, $(5/2)\pi$, $2\pi$. The height of the first subunit 30A corresponds to a phase that is equal to or greater than $2\pi$. Thus, the phase wrapping reduces the height of the first subunit to a height corresponding to a phase of $0\pi$, as indicated by the subunit 30a in FIG. 5B. The respective heights of the second and third subunits 30B, 30C correspond to phases that are within the defined range (i.e., 0 to $2\pi$) and, thus, no change is made to the heights of those subunits (see subunits 30b, 30c in FIG. 5B). The respective heights of the fourth and fifth subunits 30D, 30E correspond to phases that are equal to or greater than $2\pi$. Thus, the phase wrapping reduces the height of the fourth subunit to a height corresponding to a phase of $(\frac{1}{2})\pi$, as indicated by the subunit 30d in FIG. 5B. Likewise, the phase wrapping reduces the height of the fifth subunit to a height corresponding to a phase of $0\pi$, as indicated by the subunit 30e in FIG. 5B. As a result of phase wrapping, the prototype unit cell in FIG. 5A that corresponds to the unit cells 20C and 20F is transformed into a phase wrapped prototype unit cell 32A as shown in FIG. 5B.

In a similar manner, the prototype unit cell in FIG. 5A that corresponds to the unit cell 20D is transformed into a phase wrapped prototype unit cell 32B as shown in FIG. 5B. Likewise, the prototype unit cell in FIG. 5A that corresponds to the unit cells 20 and 20B is transformed into a phase wrapped prototype unit cell 32C as shown in FIG. 5B. Similarly, the prototype unit cell in FIG. 5A that corresponds to the unit cells 20A and 20E is transformed into a phase wrapped prototype unit cell 32D as shown in FIG. 5B.

Next, each of the unit cells 20 and 20A through 20F in FIG. 4 is replaced with the corresponding one of the phase wrapped prototype unit cells 32A through 32D. That is, unit cell 20 is replaced with prototype unit cell 32C, unit cell 20A is replaced with prototype unit cell 32D, unit cell 20B is replaced with prototype unit cell 32C, unit cell 20C is replaced with prototype unit cell 32A, unit cell 20D is replaced with prototype unit cell 32B, unit cell 20E is replaced with prototype unit cell 32D, and unit cell 20F is replaced with prototype unit cell 32A. The result is shown in FIG. 6, in which the unit cells 20 and 20A through 20F of FIG. 4 have been converted to phase wrapped unit cells 20" and 20a through 20f, respectively.

Figure 6:
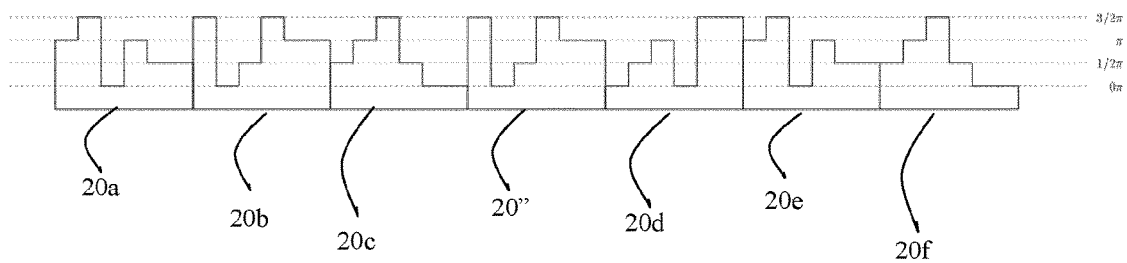
FIG. 6 shows a phase wrapped version of the height translated unit cells of FIG. 4.

The DOE design based on the phase wrapped unit cells of FIG. 6 can be implemented using only four different levels (i.e., less than would be required for the unit cells shown in FIG. 4). By folding the DOE structure back into to the original number of levels (in this example, four), the manufacturing process for the DOEs can be simplified.

As noted above, in some cases, a master tool can be prepared based on the resulting pixel layout design (e.g., a layout design that results following the random height translations as shown in FIG. 4 or a layout design that results following the phase wrapping as shown in FIG. 6). The master tool can include a multi-level structured surface that corresponds to the pixel layout design. The structured surface then can be transferred (e.g., by replication) to substrates to fabricate the DOEs, for example, in a mass production scale.

In some instances, an additive lithography process, for example, can be used to form the different levels for the design of a master tool. An additive lithographic technique allows for careful control of resist exposure and reflow processes for fabricating the master tool for complex, multi-level optical elements. The optical design can be transformed into a multilevel diffractive structure which then can be split into multiple masking patterns.

In some implementations, the additive lithographic technique includes depositing a first layer of resist (e.g., by spin coating) onto the upper surface of a wafer and, using a first mask, exposing the resist layer selectively by lithographic techniques, e.g., electron beam lithography (EBL). The exposed portions of the resist layer then are developed and removed such that selected regions of the wafer surface are no longer covered by the resist. Next, the wafer is etched, from the wafer surface, in the regions not covered by the resist to form openings down to a first depth. The remaining portions of the resist then can be removed. The foregoing steps can be repeated using additional layer(s) of resist and mask(s) to form the various levels in the DOE design. The combination of the various lithographic and etch processes results in regions at multiple different depths, which correspond to the different levels needed for the master tool. Details of the various masks used for the lithography and etch steps can be specified based on the pixel layout design. In this manner, a master tool can be fabricated based on the pixel layout design described above.

For example, after the master tool is fabricated, the master tool can be used to manufacture one or more (negative) sub-masters or replicas, which in turn can be used directly or indirectly to replicate DOEs, for example, as part of a mass production manufacturing process. Manufacturing the DOEs may take place in some instances at a wafer-level in which tens, hundreds, or even thousands of DOEs are replicated in parallel using the same sub-master or other tool derived from the master. In some instances, a structured element of the master (or a sub-master) is replicated into liquid or plastically deformable material, then hardened to make it dimensionally stable, and the structured element (e.g., the DOE) is removed. These replicating, hardening and removing steps are repeated over different parts of a substrate to form replicas of the same structured element.

In some implementations, instead of using a master tool to replicate the DOE elements, the DOE structure, based on the pixel layout design, can be etched directly into a substrate for the DOE element.

The foregoing techniques can be used to produce DOEs. For example, in some instances, a DOE fabricated in accordance with the foregoing techniques includes a plurality of periodically repeating unit cells distributed over a common plane and composed of an optical material. Each unit cell within the plurality of unit cells includes a respective plurality of subunit cells, wherein the subunit cells are arranged to cause an optical effect to incident light of a predetermined operational wavelength. Each of the subunit cells in each particular one of the unit cells has a subunit height that differs from the respective heights of adjacent ones of the subunit cells in the same unit cell. The plurality of unit cells includes at least one base unit cell and other unit cells that are not a base unit cell, wherein each of the unit cells that is not a base unit cell is a height-translated version of the base unit cell relative to the common plane.

In some implementations, each of the height translated versions of the base unit cell corresponds to a respective phase shift at the operational wavelength. For example, in some cases, each of the respective phase shifts is a respective integer multiple of $(\frac{1}{2})\pi$ at the operational wavelength. In some instances, the respective heights of adjacent ones of the subunit cells that are in the same unit cell differ by an amount that corresponds to a respective phase shift that is equal to an integer multiple of $(\frac{1}{2})\pi$ at the operational wavelength.

In some implementations, a DOE in some instances, a DOE fabricated in accordance with the foregoing techniques includes a plurality of unit cells distributed over a common plane and composed of an optical material, wherein each unit cell within the plurality of unit cells including a respective plurality of subunit cells, and wherein the subunit cells are arranged to cause an optical effect to incident light of a predetermined operational wavelength. Each of the subunit cells in each particular one of the unit cells has a respective subunit height that differs from the respective heights of adjacent ones of the subunit cells in the same unit cell. The plurality of unit cells includes at least one base unit cell and other unit cells that are not a base unit cell, wherein each of the unit cells that is not a base unit cell is a phase-wrapped version of a height-translated version of the base unit cell relative to the common plane.

In some instances, a difference in height between any two of the subunits in the diffractive optical element corresponds to a respective phase shift of no more than $2\pi$ at the operational wavelength. Further, in some cases, each of the respective phase shifts is a respective whole number multiple of $(\frac{1}{2})\pi$ at the operational wavelength. In some implementations, the respective heights of adjacent ones of the subunit cells that are in the same unit cell differ by an amount that corresponds to a respective phase shift that is equal to an integer multiple of $(\frac{1}{2})\pi$ at the operational wavelength.

In some implementations of the DOEs, the optical effect is the production of substantially diffuse illumination. In some instances, the operational wavelength is in an infrared part of the electromagnetic spectrum. The optical material can be, for example, silicon, silicon oxide, sapphire, fused silica, or any metal, dielectric, or polymer having material properties suitable to produce the optical effect.

The heights of the subunits in a particular one of the DOEs can span, for example, an integer number of discrete levels. In some implementations, the heights of the subunits span four discrete levels relative to the common plane. In other implementations, the heights of the subunits span eight or sixteen discrete levels relative to the common plane. Some implementations may incorporate other numbers of discrete levels.

Figure 7:
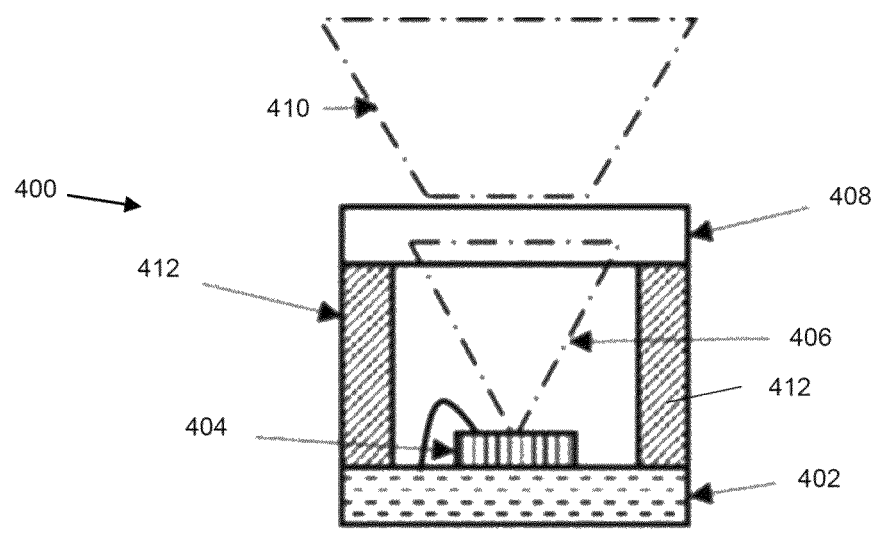
FIG. 7 illustrates an example of an optoelectronic module incorporating a DOE in accordance with the present disclosure.

In some implementations, DOEs as described in this disclosures may be integrated, for example, into optical or optoelectronic systems including a device that is operable to emit or sense light at an operational wavelength $\lambda$. As shown in FIG. 7, a module 400 includes a substrate 402 and a light-emitting component 404 coupled to or integrated into the substrate 402. The light-emitting component 404 may include, for example, a laser (for example, a vertical-cavity surface-emitting laser), a light-emitting diode or a laser diode. Light (e.g., infra-red or visible) 406 generated by the light-emitting component 404 is transmitted through a housing and then to an optical device 408 (e.g., a DOE as described in this disclosure). The optical device 408 is operable to interact with the light 406, such that modified light 410 is transmitted out of the module 400. For example, the module 400, using the optical device 408, may produce one or more of structured light, diffused light, or patterned light. The housing may include, for example, spacers 412 separating the light-emitting component 404 and/or the substrate 402 from the optical device 408.

In some implementations, the light emitting component is mounted so as to direct incident light to the unit cells of the DOE, and the light emitting component is operable to emit the incident light of the operational wavelength and to generate the optical effect.

In some implementations, the module 400 of FIG. 7 is a light-sensing module (for example, an ambient light sensor), the component 404 is a light-sensitive component (for example, a photodiode, a pixel, or an image sensor), the light 406 is incident on the module 400, and the light 410 is modified by the optical device 408. For example, the optical device 408 (e.g., a DOE as described in this disclosure) may focus patterned light onto the light-sensitive component 404. In some implementations, the module 400 may including both light-emitting and light-sensing components. In some implementations, the light-sensitive component is operable to collect reflected light from a scene or object, wherein the reflected light is generated by illuminating the scene or object with the optical effect. For example, the module 400 may emit light that interacts with an environment of the module 400 and is then received back by the module 400, allowing the module 400 to act, for example, as a proximity sensor or as a three-dimensional mapping device. The modules described above may be part of, for example, time-of-flight cameras or active-stereo cameras. The modules may be integrated into systems, for example, mobile phones, laptops, television, wearable devices, or automotive vehicles.

The optical device 408 (e.g., a DOE as described in this disclosure) may provide advantages to the module 400 compared to modules that do not include an optical device 408 as described in this disclosure. For example, the optical characteristics of the optical device 408 and the module 400 may be improved.

Various aspects of the subject matter and the functional operations described in this specification (e.g., relating to the design and/or manufacture of the DOEs) can be implemented in digital electronic circuitry, or in computer software, firmware, or hardware, or in combinations of one or more of them. Thus, aspects of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

Various modifications may be made within the spirit of this disclosure. Accordingly, other implementations also are within the scope of the claims.

What is claimed, is:

1. An apparatus comprising a diffractive optical element comprising:
   a plurality of unit cells distributed over a common plane and composed of an optical material, each unit cell within the plurality of unit cells including a respective plurality of subunit cells, wherein the subunit cells are arranged to cause an optical effect to incident light of a predetermined operational wavelength, and wherein each of the subunit cells in each particular one of the unit cells has a respective subunit height that differs from the respective heights of adjacent ones of the subunit cells in the same unit cell,
   wherein the plurality of unit cells includes at least one base unit cell and other unit cells that are not a base unit cell, and wherein each of the unit cells that is not a base unit cell is a phase-wrapped version of the base unit cell.

2. The apparatus of claim 1, wherein a difference in height between any two of the subunits in the diffractive optical element corresponds to a respective phase shift of no more than $2\pi$ at the operational wavelength.

3. The apparatus of claim 2, wherein each of the respective phase shifts is a respective whole number multiple of $(½)\pi$ at the operational wavelength.

4. The apparatus of claim 1, wherein the subunit heights span four discrete levels relative to the common plane.

5. The apparatus of claim 1, wherein the subunit heights span eight discrete levels relative to the common plane.

6. The apparatus of claim 1, wherein the subunit heights span sixteen discrete levels relative to the common plane.

7. The apparatus of claim 1 wherein the respective heights of adjacent ones of the subunit cells that are in the same unit cell differ by an amount that corresponds to a respective phase shift that is equal to an integer multiple of $(½)\pi$ at the operational wavelength.

8. The apparatus of claim 1, wherein the optical effect is a substantially diffuse illumination.

9. The apparatus of claim 1 further comprising:
   a light emitting component,
   wherein the light emitting component is mounted to direct the incident light to the plurality of unit cells, the light emitting component being operable to emit the incident light of the operational wavelength.

10. The apparatus of claim 9, wherein the light emitting component includes at least one of a light-emitting diode, a laser diode, or a vertical-cavity surface-emitting laser.

11. The apparatus of claim 9 further comprising:
    a light-sensitive component,
    wherein the light-sensitive component is operable to collect reflected light from a scene or object, wherein the reflected light is generated by illuminating the scene or object with the optical effect.

12. The apparatus of claim 1 wherein the operational wavelength is in an infrared part of the electromagnetic spectrum.

* * * * *